(12) United States Patent  (10) Patent No.: US 9,213,518 B2
Yamashita et al.  (45) Date of Patent: Dec. 15, 2015

(54) SYSTEM AND IMAGE PROCESSING APPARATUS WITH A PLURALITY OF DISPLAY DEVICES

(75) Inventors: Tomohito Yamashita, Osaka (JP); Yasuto Nishii, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 30 days.

(21) Appl. No.: 14/238,600

(22) PCT Filed: Jul. 18, 2012

(86) PCT No.: PCT/JP2012/068153
§ 371 (c)(1),
(2), (4) Date: Feb. 12, 2014

(87) PCT Pub. No.: WO2013/031398
PCT Pub. Date: Mar. 7, 2013

(65) Prior Publication Data
US 2014/0210691 A1  Jul. 31, 2014

(30) Foreign Application Priority Data
Aug. 29, 2011 (JP) .................................. 2011-185609

(51) Int. Cl.
*G09G 5/00* (2006.01)
*G06F 3/14* (2006.01)
*G09G 3/18* (2006.01)
*G09G 3/36* (2006.01)
*G06F 1/32* (2006.01)
*H04N 1/00* (2006.01)
*G06F 3/12* (2006.01)

(52) U.S. Cl.
CPC ............ *G06F 3/1423* (2013.01); *G06F 1/3215* (2013.01); *G06F 1/3265* (2013.01); *G09G 3/18* (2013.01); *G09G 3/3688* (2013.01); *G09G 5/006* (2013.01); *H04N 1/00896* (2013.01); *G06F 3/1221* (2013.01); *G06F 3/1229* (2013.01); *G06F 3/1279* (2013.01); *G09G 2330/022* (2013.01); *Y02B 60/1242* (2013.01); *Y02B 60/32* (2013.01)

(58) Field of Classification Search
None
See application file for complete search history.

(56) References Cited

U.S. PATENT DOCUMENTS 6,509,911 B1   1/2003  Shimotono
2003/0156074 A1*  8/2003  Ranganathan et al. ........ 345/1.1
(Continued)

FOREIGN PATENT DOCUMENTS

JM   2010-198065 A   9/2010
JP   10-227647 A   8/1998
(Continued)

*Primary Examiner* — Muhammad N Edun
(74) *Attorney, Agent, or Firm* — Birch, Stewart, Kolasch & Birch, LLP

(57) ABSTRACT

An image processing apparatus includes display panels included in each of an operation unit 130 and a display unit 136, and a control unit causing the two display panels to successively make transitions to a power save mode if a prescribed time period has passed without any operation to the operation unit 130. If priority is given to the operation, the control unit first causes the display panel of display unit 136 to make a transition to the power save mode, and thereafter causes the display panel of the operation unit 130 to the power save mode. If the priority is given to the display, the control unit causes the display panel of operation unit 130 to make a transition to the power save mode, and thereafter causes the display panel of display unit 136 to make a transition to the power save mode. Thus, wasteful power consumption by the two display panels can be reduced.

4 Claims, 5 Drawing Sheets

(56) References Cited

U.S. PATENT DOCUMENTS

| | | |
|---|---|---|
| 2004/0246198 A1 | 12/2004 | Sahashi |
| 2008/0301554 A1* | 12/2008 | Ishidera et al. .............. 715/700 |
| 2010/0033468 A1* | 2/2010 | Sugamata .................... 345/211 |
| 2010/0214278 A1 | 8/2010 | Miura |

FOREIGN PATENT DOCUMENTS

| | | |
|---|---|---|
| JP | 2000-163035 A | 6/2000 |
| JP | 2004-362156 A | 12/2004 |
| JP | 2009-032184 A | 2/2009 |
| JP | 2011-15209 A | 8/2011 |

* cited by examiner

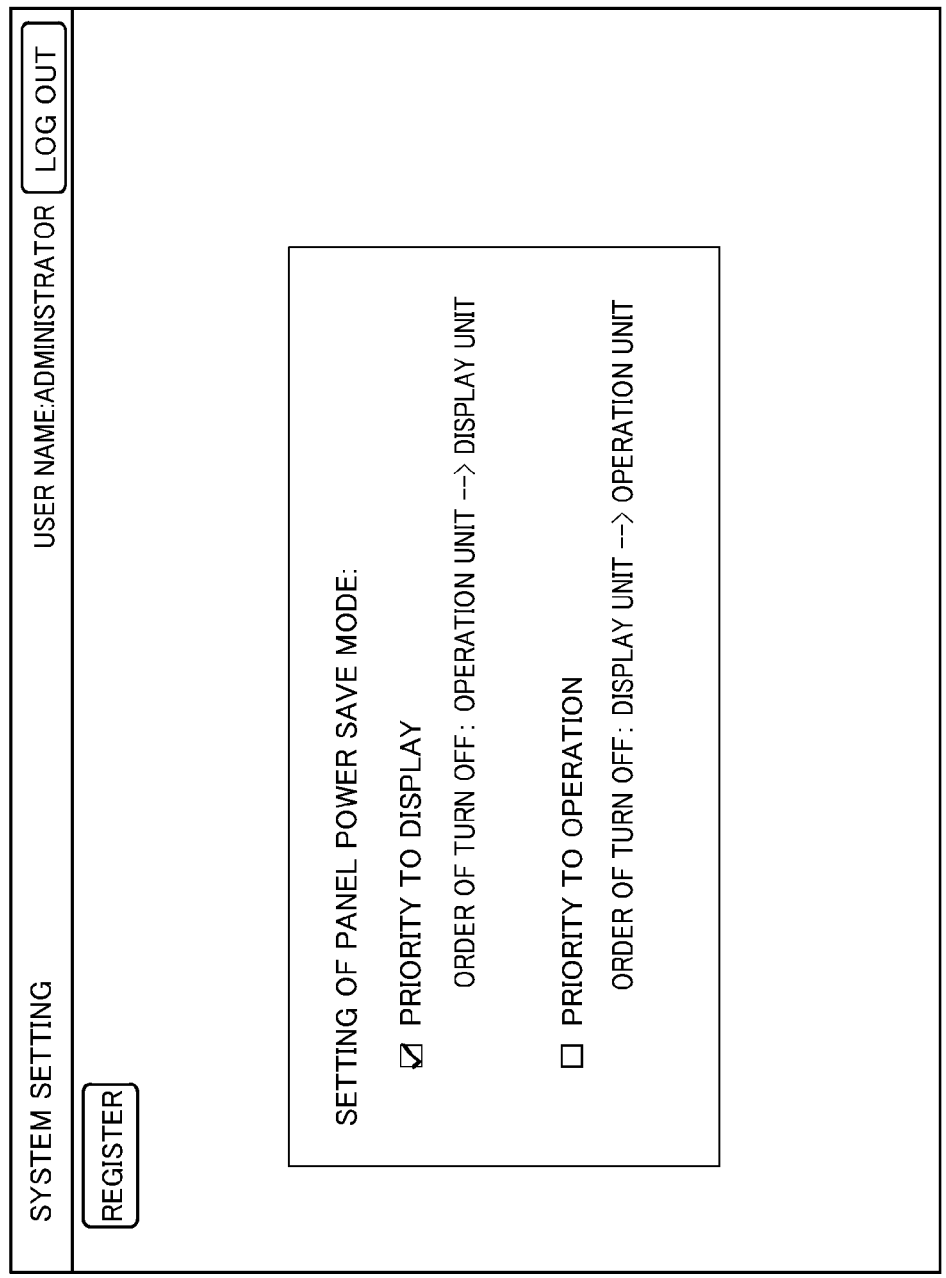

SYSTEM AND IMAGE PROCESSING APPARATUS WITH A PLURALITY OF DISPLAY DEVICES

TECHNICAL FIELD

The present invention relates to a system and an image processing apparatus including a plurality of display devices. More specifically, the present invention relates to a system and an image processing apparatus enabling efficient and effective transition of each of the display devices to a power save mode and thereby enabling reduction of wasteful power consumption by the display devices.

BACKGROUND ART

A system including one computer and a plurality of display devices (a CRT monitor, a liquid crystal display and the like) connected thereto has been known. Display devices with reduced power consumption come to be more and more widely used, for example, for a plurality of display devices connected to a personal computer, or for a large-scale multi-display system having a combination of a plurality of liquid crystal displays. When a plurality of monitors or displays are used at one time, however, power consumption is still considerably large, and there is still a problem from the viewpoint of power saving. As a solution to this problem, by way of example, Japanese Patent Laying-Open No. 2000-163035 (hereinafter referred to as ('035 Reference) discloses a technique of changing an operational mode of a display that satisfies prescribed conditions, in a computer connectable to a plurality of displays. Specifically, a display or displays other than a display on which an active window or a mouse pointer is displayed are set to off state, suspended state, or sleep state. According to '035 Reference, individual power management of a plurality of displays enables reduction of wasteful power consumption.

Recently, as one type of image processing apparatuses as electronic equipment, an image forming apparatus (typically a copy machine) for forming an image on a sheet of recording paper has been widely used. An MFP (Multi Function Peripheral) is known as one type of such image processing apparatuses. An MFP has a plurality of functions including copying, printing, facsimile function (hereinafter, facsimile is also denoted as "FAX") and scanner function.

In an MFP, a liquid crystal panel is often used as a display device. In the MFP, an operation panel having a light-transmitting touch-panel placed overlapped on a liquid crystal panel is used to facilitate operation and setting. The state of MFP is timely displayed on the liquid crystal display panel, and by a touch operation by the user (touching the touch-panel with his/her finger), the operation of MFP can be set.

An MFP having a function of reducing wasteful power consumption, by stopping power feed to a fixing unit if it is left unused for a prescribed time period after the end of a job such as copying, to save power, has been known. When the MFP is set to a power save state, the operation panel (liquid crystal display panel) is also turned off.

DISCLOSURE OF THE INVENTION

Problems to be Solved by the Invention

By way of example, consider an MFP having two liquid crystal touch-panels. When the MFP is unused, that is, when a prescribed time period has passed after the end of an operation by the user, no problem arises even if the two liquid crystal touch-panels are both caused to enter from a standby state to the power save state. In an MFP in which one liquid crystal touch-panel is used exclusively for the operation of MFP and the other liquid crystal touch-panel (that may be a simple touch-panel) is exclusively used for displaying the state of operation of MFP, the situation would be different. In such an MFP, when the user wants to operate the MFP to execute a job and when the user wants to confirm the status of a print job that is being executed by the MFP, the panels to be used are different. Therefore, in a normal mode, it is not always necessary to have the two panels both on, and keeping the two panels always on leads to wasteful power consumption. Further, it is desirable that the intended panel is readily available even if the MFP itself is in the power save mode.

In the '035 Reference, the modes of a plurality of displays are managed using information related to the positions of active window and mouse pointer and, therefore, this technique cannot directly be applied to an MFP.

Therefore, an object of the present invention is to provide a system and an image processing apparatus including a plurality of display devices, enabling efficient and effective transition of each of the display devices to a power save mode and enabling reduction of wasteful power consumption by the display devices.

Means for Solving the Problems

The above-described object can be attained, as described in the following.

According to the first aspect, the present invention provides a system with a plurality of display units. The system includes an operation unit allowing input of an instruction to the system; a control unit causing, when the plurality of display units are in a normal mode and a prescribed time period has passed without any operation to the operation unit, the plurality of display units to successively make a transition from the normal mode to a power save mode with smaller power consumption than in the normal mode; and a setting unit setting an order of causing transition of the plurality of display units to the power save mode. The control unit causes the plurality of display units to make a transition to the power save mode in accordance with the order set by the setting unit.

Preferably, the operation unit includes at least one display unit among the plurality of display units; the setting unit sets the order by setting priority to an operation to the system; and the control unit causes at least one display unit other than the display unit included in the operation unit to make a transition to the power save mode first, among the plurality of display units.

More preferably, at least one of the plurality of display units is a state display unit displaying a state of operation of the system; the setting unit sets the order by/setting priority to display of the state of operation of the system; and the control unit causes at least one display unit other than the state display unit to make a transition to the power save mode first, among the plurality of display units.

According to the second aspect, the present invention provides an image processing apparatus with a plurality of display units. The image processing apparatus includes: an operation unit allowing input of an instruction to the image processing apparatus; a control unit causing, when the plurality of display units are in a normal mode and a prescribed time period has passed without any operation to the operation unit, the plurality of display units to successively make a transition from the normal mode to a power save mode with smaller power consumption than in the normal mode; and a setting unit setting an order of causing transition of the plurality of display units to the power save mode. At least one of the plurality of display units is a state display unit displaying a state of operation of the image processing apparatus; the operation unit includes at least one display unit other than the state display unit among the plurality of display units; if the setting unit sets the order by setting priority to an operation to the image processing apparatus, the control unit causes at least one display unit other than the display unit included in the operation unit to make a transition to the power save mode first, among the plurality of display units; and if the setting unit sets the order by setting priority to display of the state of operation of the image processing apparatus, the control unit causes at least one display unit other than the state display unit to make a transition to the power save mode first, among the plurality of display units.

According to the third aspect, the present invention provides an image processing apparatus with a plurality of display units. The image processing apparatus includes: an operation unit allowing input of an instruction to the image processing apparatus; a recovery unit causing, when the plurality of display units are in a power save mode with smaller power consumption than in a normal mode and the operation unit is touched, the plurality of display units in the power save mode to successively make a transition to the normal mode; and a recovery order setting unit for setting the order of transition of the plurality of display units in the power save mode to the normal mode. At least one of the plurality of display units is a state display unit displaying a state of operation of the image processing apparatus; the operation unit includes at least one display unit other than the state display unit among the plurality of display units; if the recovery order setting unit sets the order by setting priority to operation to the image processing apparatus, the recovery unit causes the display unit included in the operation unit to make a transition to the normal mode first, among the plurality of display units; and if the recovery order setting unit sets the order by setting priority to display of the state of operation of the image processing apparatus, the recovery unit causes the state display unit to make a transition to the normal mode first, among the plurality of display units.

Effects of the Invention

According to the present invention, it is possible to have each of the plurality of display devices to make an efficient and effective transition to the power save mode, and wasteful power consumption by the display devices can be prevented.

Further, when the operation device is not operated for a prescribed time period, transition of the display device or devices to the power save mode is caused and, therefore, even when the system or the image processing apparatus itself is in operation (executing a job), wasteful power consumption by the display device or devices can be reduced.

Further, the display devices in the power save mode are returned not all at once but one by one successively and, hence, wasteful power consumption by the display devices can further be reduced.

Further, the order of transition of each of the display devices to the power save mode, or the order of recovering from the power save mode to the normal mode is set depending on whether the operation is given priority or state display is given priority. Therefore, wasteful power consumption can appropriately be reduced in accordance with the state of use of the system or the image processing apparatus.

BRIEF DESCRIPTION OF THE DRAWINGS

FIG. 5 shows an example of a setting screen image.

DESCRIPTION OF EMBODIMENTS

Figure 1:
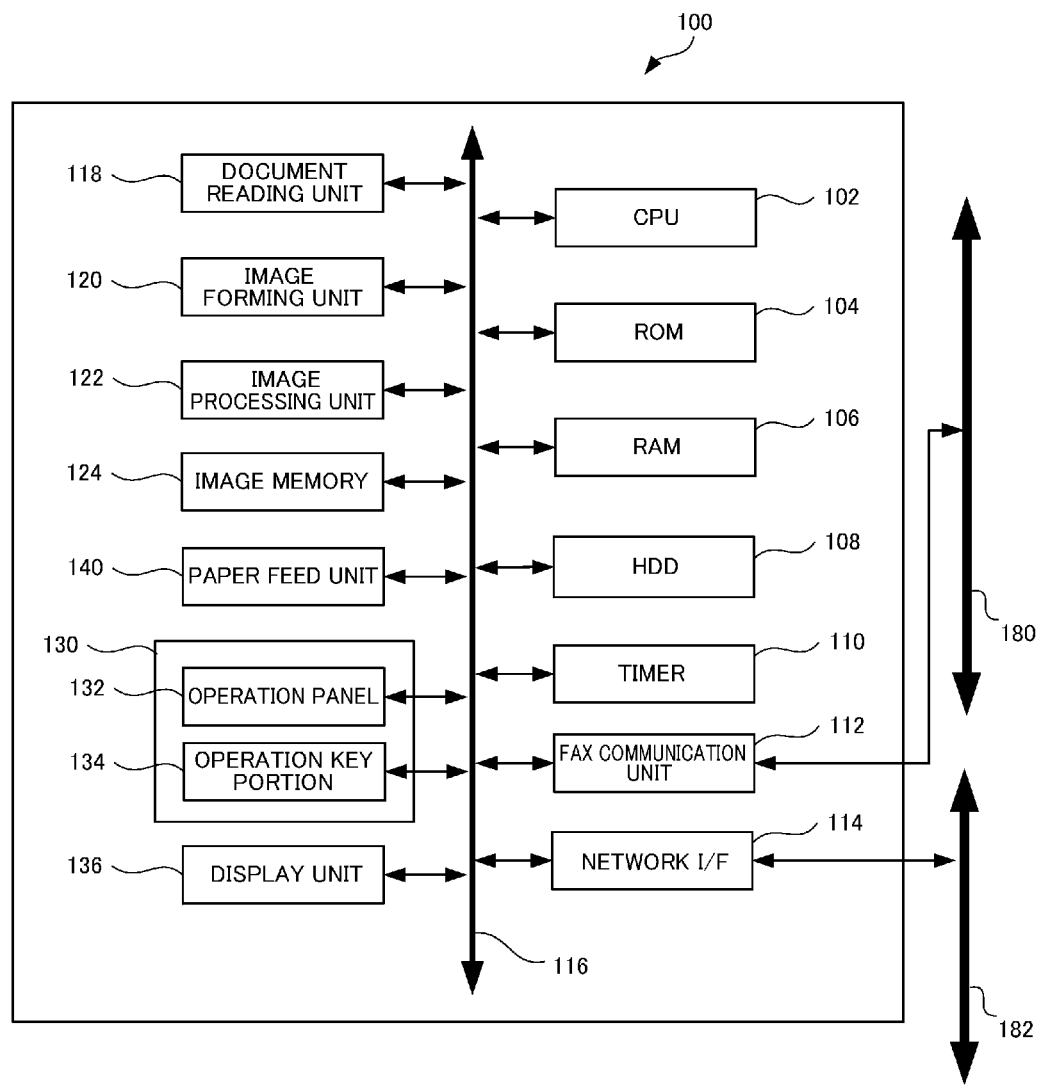
FIG. 1 is a block diagram showing a configuration of the image processing apparatus in accordance with an embodiment of the present invention.

In the embodiment below, the same components are denoted by the same reference characters. Their names and functions are also the same. Therefore, detailed description thereof will not be repeated.

The image processing apparatus in accordance with the present invention is an MFP having a plurality of functions including copy function, printer function, scanner function and facsimile function. The image processing apparatus has a function of changing the state of power conduction inside the apparatus in accordance with a preset schedule, and realizes a power saving state (hereinafter also referred to as the power save mode) with the power consumption reduced than in the normal state (hereinafter also referred to as the normal mode).

Referring to FIG. 1, an image processing apparatus 100 in accordance with the present embodiment includes a document reading unit 118, an image forming unit 120, an image processing unit 122, an image memory 124, an operation unit 130, a display unit 136, and a paper feed unit 140. Operation unit 130 includes an operation panel 132 and an operation key portion 134. Operation panel 132 includes a display panel implemented by a liquid crystal panel or the like, and a touch-panel arranged on the display panel for detecting a touched position. On operation key portion 134, a number of function keys, not shown, are arranged. Display unit 136 is a display panel implemented by a liquid crystal panel or the like.

Image processing apparatus 100 includes a control unit (hereinafter denoted as CPU) for overall control of image processing apparatus 100, an ROM (Read Only Memory) 104 for storing programs and the like, an RAM (Random Access Memory) 106 as a volatile storage, and an HDD (Hard Disk Drive) 108 as a non-volatile storage retaining data even when power is turned off. ROM 104 stores programs and data necessary for controlling the operation of image processing apparatus 100.

Image processing apparatus 100 further includes a timer 110, a FAX communication unit 112, a network I/F 114 and a bus 116. CPU 102, ROM 104, RAM 106, HDD 108, FAX communication unit 112, network I/F 114, document reading unit 118, image forming unit 120, image processing unit 122, image memory 124, operation unit 130, display unit 136 and paper feed unit 140 are connected to bus 116. CPU 102 reads a program from ROM 104 to RAM 106 through bus 116, and executes the program using a part of RAM 106 as a work area. Specifically, CPU 102 controls these various units forming image processing apparatus 100 in accordance with the program or programs stored in ROM 104, and realizes various functions of image processing apparatus 100.

Timer 110 provides current time (time information) to CPU 102.

FAX communication unit 112 includes a FAX modem. The FAX modem is an interface connected to an external public telephone line 180, enabling FAX communication between image processing apparatus 100 and an external apparatus through public telephone line 180.

Network I/F 114 is an interface connected to an external network 182, enabling communication between image processing apparatus 100 and an external apparatus through network 182 and, by way of example, it includes an NIC (Network Interface Card).

Document reading unit 118 includes a CCD (Charge Coupled Device) for reading an image, and a document detecting sensor for detecting a document set on a platen or on an automatic document feeder (ADF), and it reads a document and thereby inputs image data. The image data is temporarily stored in an image memory (not shown). Image processing unit 122 executes various image processing operations on the read image data.

Image forming unit 120 prints the image data on a sheet of recording paper. Image data is stored in HDD 108 as needed. Paper feed unit 140 holds recording paper for forming images.

Figure 2:
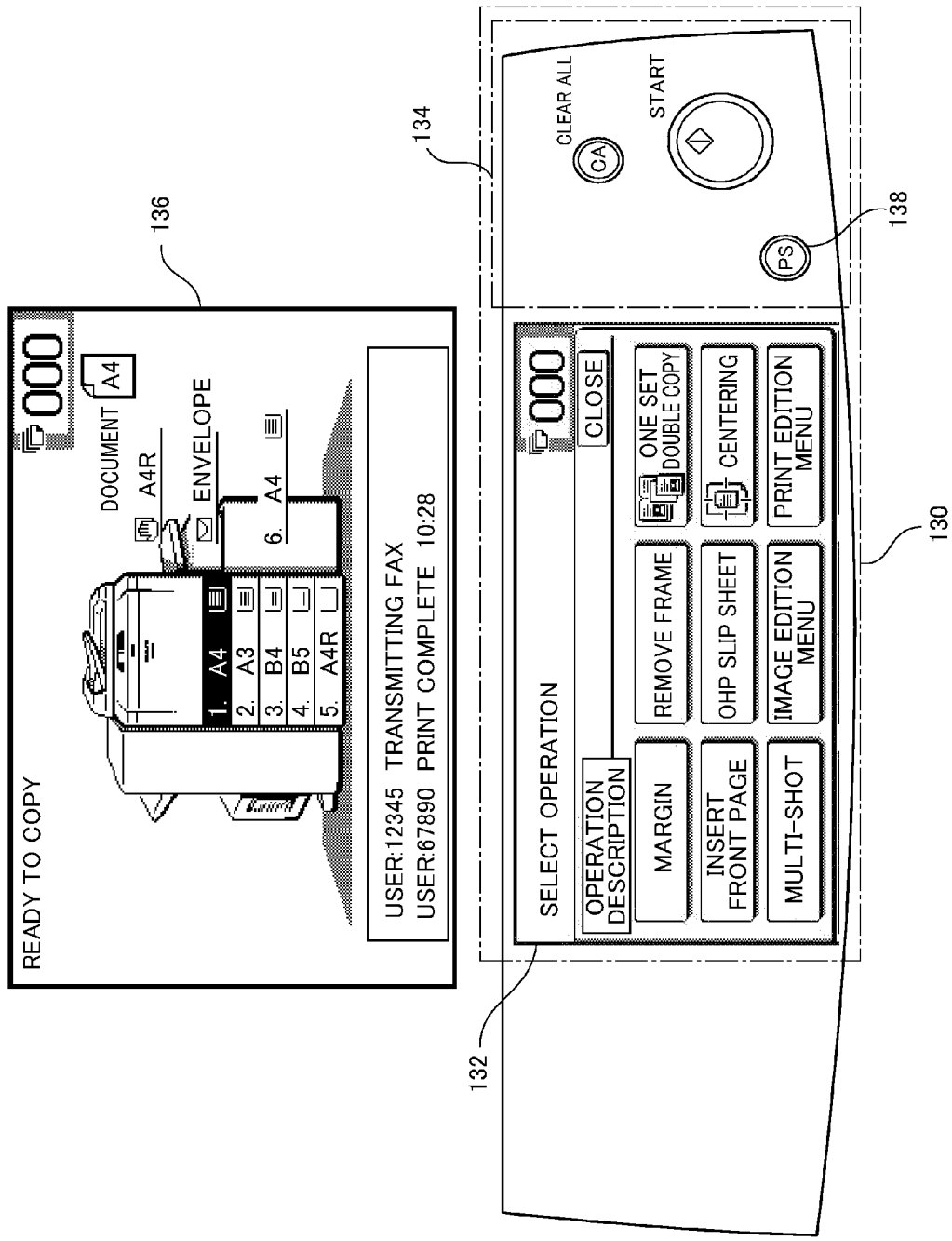
FIG. 2 shows an operation unit and a display unit of the image processing apparatus in accordance with the embodiment of the present invention.

Operation unit 130 receives inputs such as instructions to image processing apparatus 100 by the user. Referring to FIG. 2, on operation panel 132, keys for performing various operations (including condition settings) on image processing apparatus 100 are displayed. The image displayed on operation panel 132 is generated by an image generating unit (not shown). By selecting a key displayed on the display panel of operation panel 132 on the touch-panel superposed on the display panel (by touching the corresponding portion of the touch-panel), function setting and the like of image processing apparatus 100 can be done. Operation key portion 134 includes a start key, a clear all (CA) key, and a power save key 138. The start key is for causing image processing apparatus 100 to start a job. The clear all key is for clearing all settings. Power save key 138 is for making a transition from the normal mode to the power save mode or recovering from the power save mode to the normal mode, of image processing apparatus 100. On display unit 136, the state of image processing apparatus 100, job processing status and the like are displayed. A message "READY TO COPY" indicating the state of image processing apparatus 100 is displayed on an upper left corner of display unit 136. At the center of display unit 136, types of recording paper held by paper feed unit 140 is displayed, overlapped on an illustration of the image processing apparatus. At a lower portion of display unit 136, status of execution of the job set by the user is displayed.

CPU 102 monitors the user operation on operation panel 132 provided on operation unit 130 and input keys, and displays pieces of information related to the state of image processing apparatus 100 and information to be presented to the user, on display unit 136.

In the following, each of the modes executing the functions (copy function, printer function, scanner function and facsimile function) of image processing apparatus 100 will be briefly described.

(Copy Mode)

When image processing apparatus 100 is used as a copy machine, image data of a document read by document reading unit 118 is output as a copy from image forming unit 120.

By the CCD mounted at document reading unit 118, image of the document set at a reading position can be electronically read. The read image data is completed as output data (printing data) on image memory 124, and thereafter stored in HDD 108. If there is a plurality of documents, the reading and storage operations are repeated. Thereafter, in accordance with the processing mode designated through operation unit 130, the image data stored in HDD 108 is successively read and fed to image memory 124 at appropriate timing. Then, the image data is transferred to image forming unit 120, timed with the image formation at image forming unit 120.

When a plurality of prints are to be made of the read image data, similarly, the read image data is stored in HDD 108 page by page as output data, transferred from HDD 108 to image memory 124, and repeatedly transferred to image forming unit 120 timed with image formation, by the number of output prints.

At paper feed unit 140, a sheet of recording paper is drawn out by a pick-up roller, and fed to image forming unit 120 by a plurality of conveyer rollers. At image forming unit 120, a charged photoreceptor drum is exposed in accordance with the input image data, whereby an electrostatic latent image in accordance with the image data is formed on the surface of photoreceptor drum. Toner is applied to the electrostatic latent image portions on the photoreceptor drum and, thereafter, the toner image is transferred to the fed sheet of recording paper through a transfer belt. Thereafter, the sheet of recording paper is heated and pressed (whereby the image is fixed on the sheet of recording paper), and then discharged to a discharge tray 152.

(Printer Mode)

When image processing apparatus 100 is used as a printer, image data received through network I/F 114 is output from image forming unit 120 through image memory 124 and the like.

Network I/F 114 receives image data from a terminal (not shown) such as a computer connected to network 182. The received image data is fed page by page to image memory 124 as output image data, and then stored in HDD 108. Thereafter, the image data is again fed from HDD 108 to image memory 124, and in the similar manner as in the copy mode described above, the image data is transferred to image forming unit 120, in which image formation takes place.

(Scanner Mode)

When image processing apparatus 100 is used, for example, as a network scanner, the image data of a document read by document reading unit 118 is transmitted from network I/F 114 through network 182. Here again, the document is electronically read by the CCD mounted on document reading unit 118. The read document image data is completed as output data on image memory 124, and then stored in HDD 108. Thereafter, the image data is again fed from HDD 108 to image memory 124, and after a communication to a transmission destination designated through operation unit 130, transmitted from network I/F 114 to the designated transmission destination.

(Facsimile Mode)

Image processing apparatus 100 is capable of FAX transmission/reception with an external facsimile apparatus through FAX communication unit 112 and public telephone line 180.

When image processing apparatus 100 is used as a facsimile machine, data received by FAX communication from a facsimile apparatus is formed as image data on image memory 124 and, in the similar manner as described above, stored in HDD 108 and printed by image forming unit 120. Further, image processing apparatus 100 can read image data from HDD 108, convert the data to a data format for FAX communication, and transmit the data to an external facsimile apparatus through FAX communication unit 112 and public telephone line 180.

In the following, referring to FIGS. 3 and 4, the control structure of a program controlling on/off of the display panel of operation panel 132 and the display panel of display unit 136 (hereinafter also referred to as two display panels) executed by CPU 102 of image processing apparatus 100 will be specifically described.

As to the order of causing the two display panels of image processing apparatus 100 to make a transition from the normal mode to the power save mode, it is assumed that the order is set in advance by an administrator using a system setting screen image, and stored, for example, as a flag in HDD 108, as shown in FIG. 5. As a default, the order of transition of the two display panels to the power save mode is as follows: when display is given priority, operation unit 130 and display unit 136 are turned off in this order; if operation is given priority, display unit 136 and operation unit 130 are turned off in this order. By way for example, the flag is set to "0" or "1" and, the setting is such that if the flag is "0", priority is given to display, and if the flag is "1", priority is given to operation. Further, in HDD 108, the first to third transition time periods, which will be described later, are stored.

If the power of image processing apparatus 100 is turned on, a normal warm-up operation is executed and thereafter, job execution becomes possible upon reception of an operation. Thereafter, at step 400, CPU 102 reads a time period (first transition time period) to cause transition of the two display panels to the power save mode from HDD 108. Further, CPU 102 obtains the current time from timer 110.

At step 402, CPU 102 determines whether or not any operation is made to operation unit 130. If there is any operation, the control proceeds to step 404. Otherwise, the control proceeds to step 406.

At step 404, CPU 102 determines whether the operation detected at step 402 is pressing of power save key 138. If it is determined that power save key 138 is pressed, the control proceeds to step 410. Otherwise, the control proceeds to step 408.

At step 408, CPU 102 executes a process corresponding to the operation detected at step 402, and the control returns to step 400. By the operation of operation unit 130, each of the modes (copy mode, scanner mode, facsimile mode and the like) is executed, or a process such as setting of conditions in each mode is executed.

If there is no operation on operation unit 130, at step 406, CPU 102 obtains the current time from timer 110, and determines whether the first transition time period has passed from when the time information was obtained from timer 110 at step 400. If it is determined that the time has passed, the control proceeds to step 410. Otherwise, the control returns to step 402.

At step 410, CPU 102 reads setting of the power save mode related to the two display panels from HDD 108, and determines whether or not priority is given to display. Specifically, it reads the flag from HDD 108, and determines whether the flag is "0" or not. If priority is given to display (the flag is "0"), the control proceeds to step 412. Otherwise (the flag is "1"), the control proceeds to step 414.

At step 412, CPU 102 turns off the display panel of operation panel 132. Specifically, CPU 102 outputs a control signal to turn off the display, to a driver circuit of the display panel forming operation panel 132. If operation panel 132 has a liquid crystal panel as the display panel, CPU 102 outputs a control signal to the driver circuit of liquid crystal panel to turn off the backlight of liquid crystal panel.

At step 414, CPU 102 turns off the display panel of display unit 136. Specifically, CPU 102 outputs a control signal to turn off the display to a driver circuit of the display panel of display unit 136. If display unit 136 has a liquid crystal panel as the display panel, CPU 102 outputs a control signal to the driver circuit of liquid crystal panel to turn off the backlight of liquid crystal panel.

At step 416, CPU 102 reads a time period (second transition time period) to make the next transition of the display panel to the power save mode from HDD 108. Further, CPU 102 obtains the current time from timer 110.

At step 418, CPU 102 obtains the current time from timer 110, and determines whether the second transition time period has passed from when the time information was obtained from timer 110 at step 416. If it is determined that the time has passed, the control proceeds to step 420. Otherwise, the process of step 418 is repeated.

At step 420, CPU 102 turns off that one of the two display panels which is on. Specifically, if priority is given to display, CPU 102 outputs a control signal to turn off the display to the driver circuit of the display panel of display unit 136. If priority is given to operation, CPU 102 outputs a control signal to turn off the display, to the driver circuit of the display panel forming operation panel 132.

From the forgoing, it can be seen that if a prescribed time period (first transition time period) has passed without any operation made to operation unit 130 in the normal mode, not the power save mode, one of the two display panels is turned off; thereafter, if a prescribed time period (second transition time period) has further passed, the remaining one of the two display panels is turned off, so that the two display panels fully enter the power save mode. Thus, wasteful power consumption by these display panels can be prevented.

It is noted that in a standby mode (a state in the normal mode in which no job is being executed and no operation is made on the operation unit) of image processing apparatus 100, when the power save key is pressed, the image processing apparatus 100 itself enters the power save mode and, therefore, the two display panels also enter the power save mode as described above. If the prescribed time periods (first and second transition times) have passed while the power save key is not pressed, the two display panels also enter the power save mode. The image processing apparatus 100 itself, however, does not always enter the power save mode. Here, the object is to reduce wasteful power consumption by the two display panels and, therefore, the conditions (transition time period) for causing the transition of two display panels to the power save mode are not always the same as the conditions (transition time period) for causing transition of image processing apparatus 100 itself to the power save mode.

Accordingly, whether or not the two display panels are to enter the power save mode is determined solely by the elapsed time, regardless of the state of image processing apparatus 100. Specifically, even if image processing apparatus 100 is not in the standby mode but executing a job (for example, executing a print job), the two display panels enter the power save mode, if operation unit 130 is not operated for a prescribed time period.

Thereafter, at step 422, CPU 102 determines whether operation panel 132 of operation unit 130 is touched or not. If it is determined that the panel is touched, the control proceeds to step 426. Otherwise, the control proceeds to step 424.

At step 424, CPU 102 determines whether or not power save key 138 is pressed. If it is determined that the key is pressed, the control proceeds to step 426. Otherwise, the control returns to step 422.

At step 426, CPU 102 executes a recovery process, for recovering the two display panels from the power save mode to the normal mode. The recovery mode is specifically shown in FIG. 4.

Figure 4:
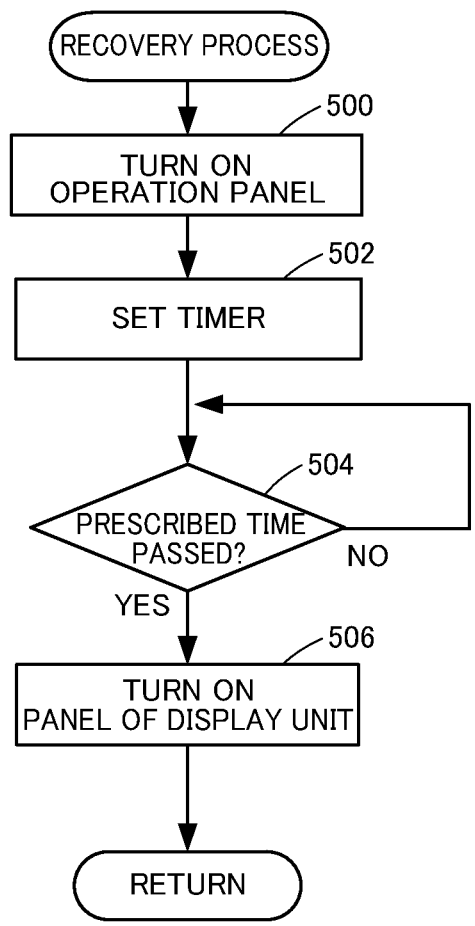
FIG. 4 is a flowchart representing a control structure of the recovery process shown in FIG. 3.

Referring to FIG. 4, at step 500, CPU 102 turns on the display panel of operation panel 132 so that it enters the normal mode. Specifically, CPU 102 outputs a control signal to turn on the display to the driver circuit of display panel of operation panel 132.

At step 502, CPU 102 reads a time period (third transition time period) to cause recovery of the display panel of display unit 136 to the normal mode from HDD 108. Further, CPU 102 obtains the current time from timer 110.

At step 504, CPU 102 obtains the current time from timer 110 and determines whether the third transition time period has passed from when the time information was obtained from timer 110 at step 502. If it is determined that the time has passed, the control proceeds to step 506. Otherwise, the process of step 504 is repeated.

At step 506, CPU 102 turns on the display panel of display unit 136. Specifically, CPU 102 outputs a control signal for turning on the display to the driver circuit of the display panel of display unit 136. Thereafter, the control returns to step 400 of FIG. 4.

In this manner, the display panels of operation panel 132 and display unit 136 return from the power save mode to the normal mode.

As described above, even when the two display panels make transitions to the power save mode after the lapse of first and second transition time periods, image processing apparatus 100 itself does not always enter the power save mode. Therefore, when the two display panels enter the power save mode after the time passed, CPU 102 maintains the mode (normal mode or power save mode) of image processing apparatus 100 itself, even if power save key 138 is pressed at step 424. If the two display panels have entered the power save mode in response to pressing of power save key 138 at step 404 and the power save key 138 is pressed at step 424, CPU 102 returns the mode of image processing apparatus 100 itself to the normal mode.

The two display panels may be arranged as desired. The vertical arrangement shown in FIG. 2 is not limiting, and the panels may be arranged horizontally. It is preferred that operation panel 132 is arranged at a position allowing easy operation by the user. The display panel of display unit 136, however, may be arranged at any position provided that visual confirmation is possible, and hence it need not be positioned close to operation panel 132.

Though an example of image processing apparatus 100 having two display panels has been described above, image processing apparatus 100 may include three or more display panels. By way of example, in addition to operation panel 132 and display unit 136, it may include a display panel for displaying help information. In that case also, as in the example above, the display panels can be turned off one by one successively, after every prescribed period of time, in accordance with the usage of three or more display panels. As to the recovery to the normal mode, the display panels may be turned on one by one successively after every prescribed period of time, in accordance with the usage of three or more display panels.

Further, when transition of three or more display panels to the power save mode is to be done, two display panels may be turned off simultaneously, depending on the usage of display panels. By way of example, assume that operation panel 132, a display panel displaying the state of image processing apparatus 100 and a display panel for displaying help information are provided. If the priority is given to the display, operation panel 132 and the display panel displaying help information may be simultaneously turned off first. If the priority is given to operation, first, the display panel displaying the state of image processing apparatus 100 and the display panel displaying the help information may be simultaneously turned off.

Figure 3:
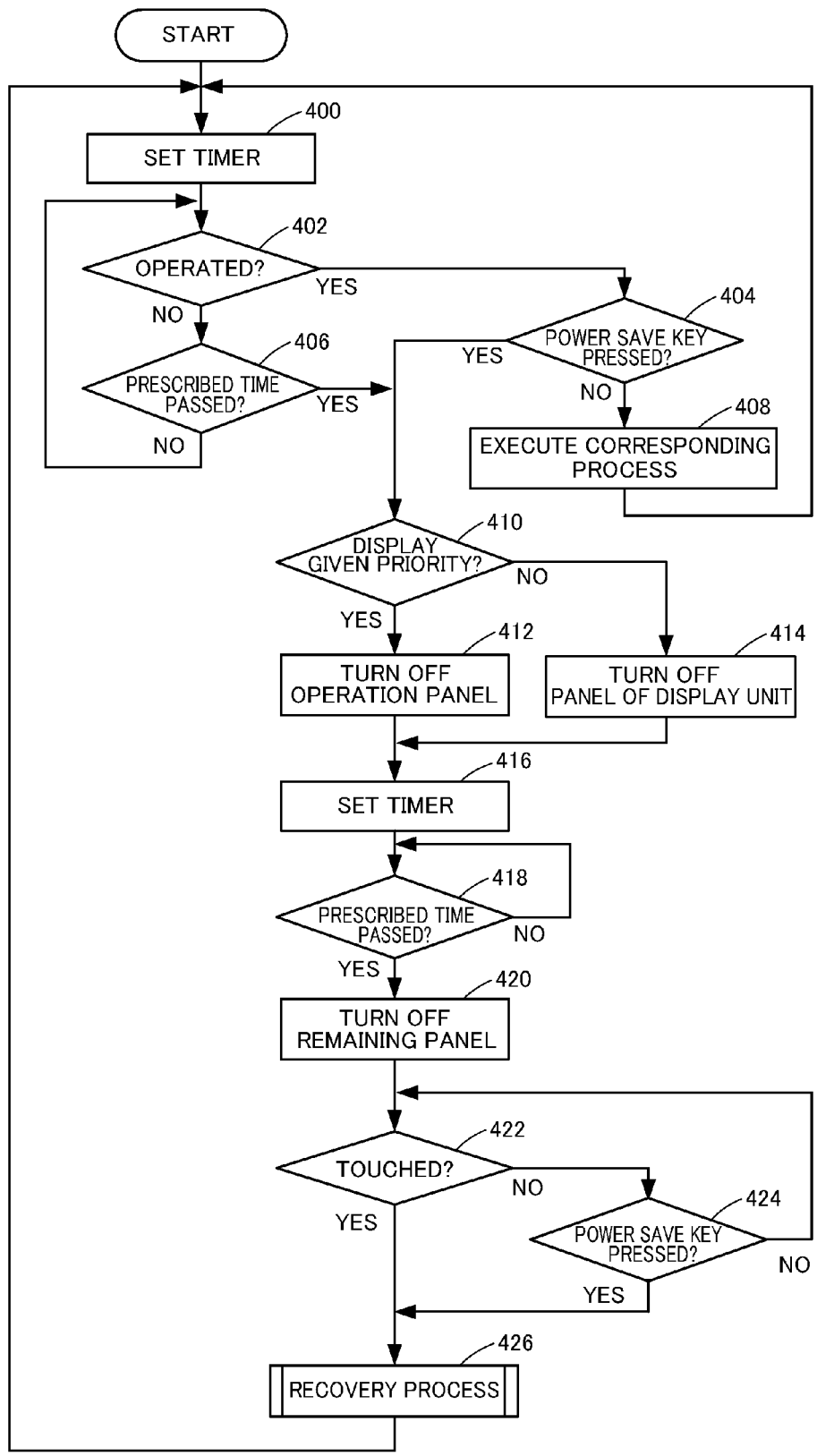
FIG. 3 is a flowchart representing a control structure of a program controlling modes of a plurality of display panels of the image processing apparatus in accordance with the embodiment of the present invention.

The processes shown in FIGS. 3 and 4 may be appropriately modified and executed. By way of example, power save key 138 may possibly be pressed after step 416 above and before execution of step 420. Therefore, whether or not power save key 138 has been pressed may be determined, and if pressed, the display panel that has been turned off at step 412 or 414 may be turned on.

Further, though an example in which operation panel 132 is turned on first at the time of recovery has been described, display unit 136 may be recovered first. Further, if a touch sensor (including a touch-panel) is mounted on display unit 136, which of operation panel 132 and display unit 136 is touched may be determined, and the display panel of touched unit may be turned on first.

The order of recovery may be set in advance as system setting. By way of example, it is possible to recover operation panel 132 first if the setting puts priority on operation, and to recover display unit 136 first if priority is on display.

At the time of recovery, the plurality of display panels are not simultaneously turned on but successively turned on at time intervals. The reason for this is that it takes about 1 minute for the image processing apparatus to recover from the power save mode and operation is impossible during this time period. Therefore, power consumption is reduced as much as possible by keeping the display off in this period.

Further, at the time of recovery, not all display panels may be recovered successively. Only a display panel or panels necessary for the user's operation may be recovered and display panels not related to the contents of user's operation may be kept off.

Further, the first to third transition time periods may be set appropriately. It is preferred that the transition time periods can be set by an administrator on the system setting screen image, for example, in accordance with the situation in which the image processing apparatus is used.

Further, the power save mode of the operation unit and the display unit is not limited to the state in which the backlight of liquid crystal panels is off. It may be any state in which the power consumption is lower than in the normal mode.

Further, though an image processing apparatus has been described in the embodiment above, application of the present invention is not limited to the image processing apparatuses, and it is applicable to general systems. Specifically, it is applicable to any system including a plurality of display devices, in which at least one display device serves as an operation device for the system and at least another display device displays the state of operation of the system.

As described above, according to an aspect, the present invention provides a system with a plurality of display units, including; an operation unit allowing input of an instruction to the system; and a recovery unit causing, when the plurality of display units are in the power save mode with smaller power consumption than in the normal mode and the operation unit is touched, the plurality of display units in the power save mode to successively make a transition to the normal mode.

Preferably, the system further includes a recovery order setting unit for setting the order of transition of the plurality of display units in the power save mode to the normal mode.

More preferably, the operation unit includes a least one display unit among the plurality of display units; the recovery setting unit sets the order by setting priority to the operation to the system; and the recovery unit causes the display unit included in the operation unit to make a transition to the normal mode first, among the plurality of display units.

More preferably, at least one display unit of the plurality of display units is a state display unit displaying the state of operation of the system; the recovery order setting unit sets the order by setting priority to the display of state of operation of the system; and the recovery unit causes the state display unit to make a transition to the normal mode first, among the plurality of display units.

As described above, according to an aspect, the present invention provides a method of controlling a system with an operation device and a plurality of display devices, including the steps of: receiving an instruction to the system by a touch to the operation device; determining, while the plurality of display devices are in the normal mode, whether or not a prescribed time period has passed without any touch to the operation device; and if it is determined that the prescribed time period has passed, causing the plurality of display devices to successively make a transition from the normal mode to the power save mode with smaller power consumption than in the normal mode.

Further, according to another aspect, the present invention provides a method of controlling a system with an operation device and a plurality of display devices, including the steps of: receiving an instruction to the system by a touch to the operation device; determining, while the plurality of display devices are in the power save mode with smaller power consumption than in the normal mode, whether or not the operation device is touched; and if it is determined that the operation device is touched, causing the plurality of display devices in the power save mode to successively make a transition to the normal mode.

Although the present invention has been described with reference to the embodiments, it is clearly understood that the same is by way of illustration and example only and is not to be taken by way of limitation, and various modifications may be made to make use of the invention.

INDUSTRIAL APPLICABILITY

According to the present invention, it is possible to provide a system, an image processing apparatus and control method thereof, enabling efficient and effective transition of each of the display devices to a power save mode and thereby enabling reduction of wasteful power consumption by the display devices.

DESCRIPTION OF THE REFERENCE SIGNS 100 image processing apparatus
102 control unit (CPU)
104 ROM
106 RAM
108 HDD
110 timer
112 FAX communication unit
114 network I/F
116 bus
118 document reading unit
120 image forming unit
122 image processing unit
124 image memory
130 operation unit
132 operation panel
134 operation key portion
136 display unit
140 paper feed unit

The invention claimed is:

1. A system with a plurality of display units, comprising:
an operation unit allowing input of an instruction to the system;
a control unit causing, when said plurality of display units are in a normal mode and a prescribed time period has passed without any operation to said operation unit, said plurality of display units to successively make a transition from said normal mode to a power save mode with smaller power consumption than in said normal mode; and
a setting unit setting an order of causing transition of said plurality of display units to said power save mode; wherein
said control unit causes said plurality of display units to make a transition to said power save mode in accordance with the order set by said setting unit,
said operation unit includes at least one display unit among said plurality of display units;
said setting unit sets said order by setting priority to an operation to said system; and
said control unit causes at least one display unit other than the display unit included in said operation unit to make a transition to said power save mode first, among said plurality of display units.

2. A system with a plurality of display units, comprising:
an operation unit allowing input of an instruction to the system;
a control unit causing, when said plurality of display units are in a normal mode and a prescribed time period has passed without any operation to said operation unit, said plurality of display units to successively make a transition from said normal mode to a power save mode with smaller power consumption than in said normal mode; and
a setting unit setting an order of causing transition of said plurality of display units to said power save mode; wherein
said control unit causes said plurality of display units to make a transition to said power save mode in accordance with the order set by said setting unit,
at least one of said plurality of display units is a state display unit displaying a state of operation of the system;
said setting unit sets said order by setting priority to display of the state of operation of said system; and
said control unit causes at least one display unit other than said state display unit to make a transition to said power save mode first, among said plurality of display units.

3. The system according to claim 2, wherein
said operation unit includes at least one display unit other than said state display unit among said plurality of display units;
said setting unit is capable of setting said order by setting priority to an operation to said system in place of setting priority to display the state of operation of said system; and
in response to setting of priority to the operation of said system, said control unit causes at least one display unit other than the display unit included in the operation unit to make a transition to said power save mode first, among said plurality of display units.

4. An image processing apparatus with a plurality of display units, comprising:
an operation unit allowing input of an instruction to said image processing apparatus;
a recovery unit causing, when said plurality of display units are in a power save mode with smaller power consumption than in a normal mode and said operation unit is touched, said plurality of display units in said power save mode to successively make a transition to said normal mode; and a recovery order setting unit for setting the order of transition of said plurality of display units in said power save mode to said normal mode; wherein at least one of said plurality of display units is a state display unit displaying a state of operation of said image processing apparatus;

said operation unit includes at least one display unit other than said state display unit among said plurality of display units;

if said recovery order setting unit sets said order by setting priority to operation to said image processing apparatus, said recovery unit causes the display unit included in said operation unit to make a transition to said normal mode first, among said plurality of display units; and if said recovery order setting unit sets said order by setting priority to display of the state of operation of said image processing apparatus, said recovery unit causes said state display unit to make a transition to said normal mode first, among said plurality of display units.

* * * * *